United States Patent
Du et al.

(10) Patent No.: US 12,125,973 B2
(45) Date of Patent: Oct. 22, 2024

(54) SOLID STATE IONIC CONDUCTIVE ELECTROLYTE MEMBRANE AND SYSTEM FOR SELECTIVELY EXTRACTING ALKALINE METALS

(71) Applicant: Ampcera Inc., Milpitas, CA (US)

(72) Inventors: Hui Du, Tucson, AZ (US); Sumin Zhu, Tucson, AZ (US); James Emery Brown, Tucson, AZ (US)

(73) Assignee: Ampcera Inc., Milpitas, CA (US)

(*) Notice: Subject to any disclaimer, the term of this patent is extended or adjusted under 35 U.S.C. 154(b) by 0 days.

(21) Appl. No.: 18/226,392

(22) Filed: Jul. 26, 2023

(65) Prior Publication Data

US 2023/0378526 A1 Nov. 23, 2023

Related U.S. Application Data

(62) Division of application No. 16/645,470, filed as application No. PCT/US2018/050990 on Sep. 14, 2018, now Pat. No. 11,769,906.

(60) Provisional application No. 62/558,382, filed on Sep. 14, 2017.

(51) Int. Cl.
H01M 10/0562 (2010.01)
H01M 10/0525 (2010.01)

(52) U.S. Cl.
CPC ... *H01M 10/0562* (2013.01); *H01M 10/0525* (2013.01); *H01M 2300/0068* (2013.01); *H01M 2300/0085* (2013.01)

(58) Field of Classification Search
CPC .................. H01M 10/0562; H01M 10/0525
See application file for complete search history.

(56) References Cited

U.S. PATENT DOCUMENTS 5,716,735 A * 2/1998 Muffoletto ........ H01M 10/0413
429/211
2016/0351889 A1* 12/2016 Swonger ................ A61N 1/378

* cited by examiner

*Primary Examiner* — Jayne L Mershon
(74) *Attorney, Agent, or Firm* — Walters & Wasylyna LLC

(57) ABSTRACT

A solid state ionic conductive electrolyte membrane may include a multi-channel porous support structure and a solid-state ionic conductive electrolyte. The multi-channel porous support structure may define a porous wall structure separating a first plurality of channels from a second plurality of channels, and a solid-state ionic conductive electrolyte may be positioned within pores of the porous wall structure of the multi-channel structure.

16 Claims, 7 Drawing Sheets

Example of a porous tube.

SOLID STATE IONIC CONDUCTIVE ELECTROLYTE MEMBRANE AND SYSTEM FOR SELECTIVELY EXTRACTING ALKALINE METALS

PRIORITY

The present invention is a divisional application of U.S. Non-Provisional patent application Ser. No. 16/645,470, which is a U.S. national stage entry under 35 U.S.C. § 371 of Intl. Pat. App. No. PCT/US18/50990, filed on Sep. 14, 2018, which claims the priority of U.S. Provisional Patent Application No. 62/558,382, filed Sep. 14, 2017, all of which are incorporated herein by reference in their entireties.

FIELD

The present description relates to the field of systems and methods for selectively extracting alkaline metals from metal-rich solutions, in particular systems and methods for selectively extracting lithium from lithium-rich solutions

BACKGROUND

The demand for lithium batteries has skyrocketed over the past two decades owing to the booming battery-powered electronics market, and the rapidly expanding electric-powered automobile industry. This in turn has put unprecedented pressure on upstream lithium production which has added to the high cost of lithium batteries. At the same time downstream disposal of lithium batteries has rapidly increased and if not recycled properly, serious environmental pollution can ensue. Moreover, the current disposal methods are not only expensive but waste valuable lithium resources. With proper recycling, the cost of lithium would not only decrease but it could also relieve some of the pressure in the upstream production.

Traditional mainstream lithium production includes the following two methods:
1. Brine evaporation. This is a very slow process with a high startup cost which can take up to 18 months to concentrate enough brine to be economically feasible since only 40-50% of the available lithium can be extracted.
2. Spodumene roasting. Though faster than brine evaporation, this process involves the crushing, roasting and leaching of spodumene which requires more energy and has a higher cost. Additional cost is also required to further purify the product to a high grade suitable for lithium batteries. Moreover, the process can also lead to long term damage to the local environment.

Even though the process of electrolysis has been described as one of the possible alternatives for lithium extraction, it depends heavily on a large quantity of available low-cost electricity which make can often make it cost prohibitive. New technologies using advanced lithium separation and extraction are needed to accelerate the lithium production process and reduce the cost of lithium.

SUMMARY

In a first embodiment, a solid state ionic conductive electrolyte membrane includes a garnet-like structure oxide material with the general formula:

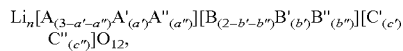

$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;
b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'+b'' \leq 2$;
c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and
d. wherein $n = 7 + a' + 2 \cdot a'' - b' - 2 \cdot b'' - 3 \cdot c' - 4 \cdot c''$ and $4.5 \leq n \leq 7.5$.

In a second embodiment, a solid state ionic conductive electrolyte membrane includes a multi-channel porous support structure and a solid state ionic conductive electrolyte in the multi-channel porous support structure.

In yet another embodiment, a system for selectively extracting alkaline metals includes: a first solution comprising a first concentration of alkaline ions; a second solution comprising a second concentration of alkaline ions, the first concentration of alkaline ions being higher than the second concentration of alkaline ions; and the solid state ionic conductive electrolyte membrane of the first or second embodiments.

In yet another embodiment, a method for selectively extracting alkaline metals includes: providing a first solution comprising a concentration of alkaline ions; selectively passing the alkaline ions through a solid state ionic conductive electrolyte membrane of the first or second embodiments; and extracting the alkaline ions passed through the solid state ionic conductive electrolyte membrane.

Other embodiments of the disclosed systems and methods for selectively extracting alkaline metals from metal-rich solutions will become apparent from the following detailed description, the accompanying drawings and the appended claims.

DETAILED DESCRIPTION

Figure 1:
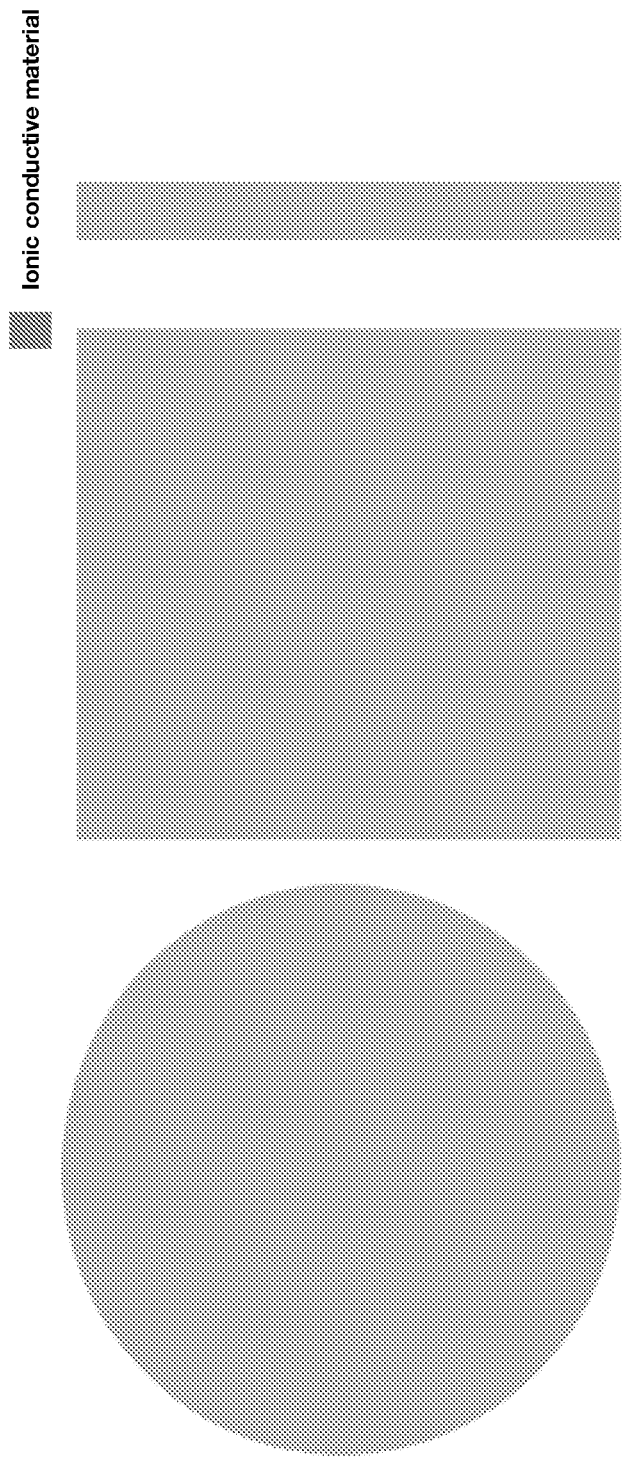
FIG. 1 illustrates a top view of an exemplary flat plate shaped solid state ionic conductive electrolyte membrane, a top view of an exemplary disk plate shaped solid state ionic conductive electrolyte membrane, and a side view of the solid state ionic conductive electrolyte membranes, in which the whole membranes are ionic conductive.

The present description relates to the field of systems and methods for selectively extracting alkaline metals from metal-rich solutions, in particular systems and methods for selectively extracting lithium from lithium-rich solutions. Although the systems and methods are typically described with reference to selectively extracting lithium from lithium-rich solutions using solid state lithium selective ionic conductive electrolytes, the lithium selective solid state ionic conductive electrolytes may be replaced with solid state ionic conductive electrolytes of another chosen alkaline metal, and, in particular sodium and potassium, to selective extract the chosen metal from metal-rich solutions of the chosen metal.

According to a first embodiment of the present description, there is a solid state ionic conductive electrolyte membrane including a garnet-like structure oxide material with the general formula:

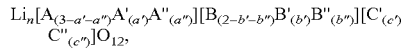

$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

The symbol "$\leq$" is defined as less than or equal to. In an alternative expression of the formula, each of the symbols "$\leq$" in the above formula may be replaced with "<" in recognition of the inevitable presence of trace amounts of the respective elements.

In a first aspect of the solid state ionic conductive electrolyte membrane, A stands for one or more of La, Ce, Sc, Y, Pr, Nd, Sm, Eu, Gd, Tb, Dy, Ho, Er, Tm, and Yb.

In a second aspect of the solid state ionic conductive electrolyte membrane, A' stands for one or more of Mg, Ca, Sr, and Ba. The second aspect of the solid state ionic conductive electrolyte membrane may be combined with the first aspect of the solid state ionic conductive electrolyte membrane.

In a third aspect of the solid state ionic conductive electrolyte membrane, A" stands for one or more of Na and K. The third aspect of the solid state ionic conductive electrolyte membrane may be combined with the first aspect of the solid state ionic conductive electrolyte membrane. Alternatively, the third aspect of the solid state ionic conductive electrolyte membrane may be combined with the second aspect of the solid state ionic conductive electrolyte membrane. Alternatively, the third aspect of the solid state ionic conductive electrolyte membrane may be combined both the first and second aspects.

In a fourth aspect of the solid state ionic conductive electrolyte membrane, B stands for one or more of Zr, Hf, and Ti. The fourth aspect of the solid state ionic conductive electrolyte membrane may be combined with the first aspect of the solid state ionic conductive electrolyte membrane. Alternatively, the fourth aspect of the solid state ionic conductive electrolyte membrane may be combined with the second aspect of the solid state ionic conductive electrolyte membrane. Alternatively, the fourth aspect of the solid state ionic conductive electrolyte membrane may be combined with the third aspect of the solid state ionic conductive electrolyte membrane. Alternatively, the fourth aspect of the solid state ionic conductive electrolyte membrane may be combined with any combination of two or more of the first aspect, the second aspect, and the third aspect.

In a fifth aspect of the solid state ionic conductive electrolyte membrane, B' stands for one or more of Ta, Nb, V, Sb, and Bi. The fifth aspect of the solid state ionic conductive electrolyte membrane may be combined with the first aspect of the solid state ionic conductive electrolyte membrane. Alternatively, the fifth aspect of the solid state ionic conductive electrolyte membrane may be combined with the second aspect of the solid state ionic conductive electrolyte membrane. Alternatively, the fifth aspect of the solid state ionic conductive electrolyte membrane may be combined with the third aspect of the solid state ionic conductive electrolyte membrane. Alternatively, the fifth aspect of the solid state ionic conductive electrolyte membrane may be combined with the fourth aspect of the solid state ionic conductive electrolyte membrane. Alternatively, the fifth aspect of the solid state ionic conductive electrolyte membrane may be combined with any combination of two or more of the first aspect, the second aspect, the third aspect, and the fourth aspect.

In a sixth aspect of the solid state ionic conductive electrolyte membrane, B" stands for one or more of Te, W, and Mo. The sixth aspect of the solid state ionic conductive electrolyte membrane may be combined with the first aspect of the solid state ionic conductive electrolyte membrane. Alternatively, the sixth aspect of the solid state ionic conductive electrolyte membrane may be combined with the second aspect of the solid state ionic conductive electrolyte membrane. Alternatively, the sixth aspect of the solid state ionic conductive electrolyte membrane may be combined with the third aspect of the solid state ionic conductive electrolyte membrane. Alternatively, the sixth aspect of the solid state ionic conductive electrolyte membrane may be combined with the fourth aspect of the solid state ionic conductive electrolyte membrane. Alternatively, the sixth aspect of the solid state ionic conductive electrolyte membrane may be combined with the fifth aspect of the solid state ionic conductive electrolyte membrane. Alternatively, the sixth aspect of the solid state ionic conductive electrolyte membrane may be combined with any combination of two or more of the first aspect, the second aspect, the third aspect, the fourth aspect, and the fifth aspect.

In a seventh aspect of the solid state ionic conductive electrolyte membrane, C' stands for one or more of Al, Ga, and boron. The seventh aspect of the solid state ionic conductive electrolyte membrane may be combined with the first aspect of the solid state ionic conductive electrolyte membrane. Alternatively, the seventh aspect of the solid state ionic conductive electrolyte membrane may be combined with the second aspect of the solid state ionic conductive electrolyte membrane. Alternatively, the seventh aspect of the solid state ionic conductive electrolyte membrane may be combined with the third aspect of the solid state ionic conductive electrolyte membrane. Alternatively, the seventh aspect of the solid state ionic conductive electrolyte membrane may be combined with the fourth aspect of the solid state ionic conductive electrolyte membrane. Alternatively, the seventh aspect of the solid state ionic conductive electrolyte membrane may be combined with the fifth aspect of the solid state ionic conductive electrolyte membrane. Alternatively, the seventh aspect of the solid state ionic conductive electrolyte membrane may be combined with the sixth aspect of the solid state ionic conductive electrolyte membrane. Alternatively, the seventh aspect of the solid state ionic conductive electrolyte membrane may be combined with any combination of two or more of the first aspect, the second aspect, the third aspect, the fourth aspect, the fifth aspect, and the sixth aspect.

In an eighth aspect of the solid state ionic conductive electrolyte membrane, the value of n is preferably within the range of $5.5 < n < 6.875$. The eighth aspect of the solid state ionic conductive electrolyte membrane may be combined with the first aspect of the solid state ionic conductive electrolyte membrane. Alternatively, the eighth aspect of the solid state ionic conductive electrolyte membrane may be combined with the second aspect of the solid state ionic conductive electrolyte membrane. Alternatively, the eighth aspect of the solid state ionic conductive electrolyte membrane may be combined with the third aspect of the solid state ionic conductive electrolyte membrane. Alternatively, the eighth aspect of the solid state ionic conductive electrolyte membrane may be combined with the fourth aspect of the solid state ionic conductive electrolyte membrane. Alternatively, the eighth aspect of the solid state ionic conductive electrolyte membrane may be combined with the fifth aspect of the solid state ionic conductive electrolyte membrane. Alternatively, the eighth aspect of the solid state ionic conductive electrolyte membrane may be combined with the sixth aspect of the solid state ionic conductive electrolyte membrane. Alternatively, the eighth aspect of the solid state ionic conductive electrolyte membrane may be combined with the seventh aspect of the solid state ionic conductive electrolyte membrane. Alternatively, the eighth aspect of the solid state ionic conductive electrolyte membrane may be combined with any combination of two or more of the first aspect, the second aspect, the third aspect, the fourth aspect, the fifth aspect, the sixth aspect, and the seventh aspect.

In a specific example of the present description, there is a solid state ionic conductive electrolyte membrane including a garnet-like structure oxide material with the general formula:

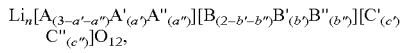

a. where A, A', and A" stand for a dodecahedral position of the crystal structure, i. where A stands for one or more of La, Ce, Sc, Y, Pr, Nd, Sm, Eu, Gd, Tb, Dy, Ho, Er, Tm, and Yb, ii. where A' stands for one or more of Mg, Ca, Sr, and Ba, iii. where A" stands for one or more of Na and K, and iv. wherein $0 \leq a' \leq 2$ and $0 \leq a'' \leq 1$;

b. where B, B', and B" stand for an octahedral position of the crystal structure, i. where B stands for one or more of Zr, Hf, and Ti, ii. where B' stands for one or more of Ta, Nb, V, Sb, and Bi, iii. where B" stands for one or more of Te, W, and Mo, and iv. wherein $0 < b' + b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

In another specific aspect of the present description, there is a solid state ionic conductive electrolyte membrane including a garnet-like structure oxide material with the general formula:

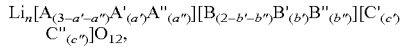

a. where A, A', and A" stand for a dodecahedral position of the crystal structure, i. where A stands for one or more of La, Y, Pr, Nd, Sm, Eu, Gd, Tb, Dy, Ho, Er, Tm, and Yb, where A' stands for one or more of Ca, Sr, and Ba, iii. where A" stands for one or more of Na and K, and iv. wherein $0 < a' < 2$ and $0 < a'' < 1$;

b. where B, B', and B" stand for an octahedral position of the crystal structure, i. where B stands for one or more of Zr and Hf, ii. where B' stands for one or more of Ta, Nb, Sb, and Bi, iii. where B" stands for one or more of Te, W, and Mo, and iv. wherein $0 < b' + b'' < 2$;

c. where C' and C" stand for a tetrahedral position of the crystal structure, i. where C' stands for one or more of Al and Ga, ii. where C" stands for one or more of Si and Ge, and iii. wherein $0 < c' < 0.5$ and $0 < c'' < 0.4$; and d. wherein $n = 7 + a' + 2 \cdot a'' - b' - 2 \cdot b'' - 3 \cdot c' - 4 \cdot c''$ and $5.5 < n < 6.875$.

The garnet-like structure oxide material of the above-described solid state ionic conductive electrolyte membrane enables the following technical effects:

First, the garnet-like structure oxide material has high lithium ionic conductivity. In an aspect, the garnet-like structure oxide material has high lithium ionic conductivity at room temperature and/or reasonable elevated temperature.

Second, the garnet-like structure oxide material has a high selectivity to one or more alkaline metal ions, particularly lithium ions. This means selectively letting the one or more alkaline metal ions (e.g., lithium ions) pass through the material more than other elements present in an alkaline metal-rich solution (e.g., lithium-rich solution).

Third, the garnet-like structure oxide material is stable with respect to a lithium-rich solution on the first side of the membrane and/or with respect to a solution on the second side of the membrane. In an aspect, aqueous systems are preferred for the solutions on the first and second side of the membrane, therefore, when aqueous systems are selected, the garnet-like structure oxide material is stable in water.

Fourth, the garnet-like structure oxide material is stable in at least some acidic or basic conditions.

The following exemplary materials were made into pellets with thickness of 0.5 mm and tested in aqueous lithium-rich solutions from lithium mining. The pellets demonstrated high ionic conductivity, high lithium selectivity and chemical compatibility to aqueous solutions:

$Li_{6.3}La_3Zr_{1.65}W_{0.35}O_{12}$ (W-doped LLZO)

$Li_{6.5}La_3Zr_{1.5}Nb_{0.5}O_{12}$ (Nb-doped LLZO)

$Li_{6.4}La_3Zr_{1.4}Ta_{0.6}O_{12}$ (Ta-doped LLZO)

The above-described solid state ionic conductive electrolyte membrane according to any combination of one of more aspects of the first embodiment of the present description is not limited by structural design of the membrane.

In one aspect, the membrane includes a porous support structure and the garnet-like structure oxide material is disposed on the porous support structure.

Other optional aspects of the structural design of the membrane will be apparent from the remainder of the present description. For example, the structural design used for the above-described solid state ionic conductive membrane including the garnet-like structure oxide material may have one or more of the following characteristics:

1. First, the membrane meets mechanical strength requirements to withstand the liquid pressure and flowing forces.
2. Second, the membrane is dense enough to prevent leak of liquid therethrough or crossover from liquids in side one to side two or side two to side one.
3. Third, the membrane is chemically inert to the liquid media it is exposed to, thus to avoid chemical corrosion and erosion during operation and over time.

In an aspect, the membrane may be generally planar, such that solutions are respectively disposed on opposing sides of the membrane. In another aspect, the membrane may be tubular, such that solutions are respectively disposed on an interior and an exterior of the membrane.

In one aspect, the overall structure of the membrane may be formed from the garnet-like structure oxide material used for the solid state ionic conductive electrolyte, such that the garnet-like structure oxide material itself plays the role of ionic conductor and also provides the mechanical support.

In another aspect, the membrane may include a porous support structure and the garnet-like structure oxide material used for the solid state ionic conductive electrolyte may be disposed on the porous support structure. The porous support structure may be electrically conductive or non-conductive as required by the target application.

In an aspect, the solid state ionic conductive electrolyte may be built with traditional slurry sedimentation, spraying, dipping, filtration, pyrolysis, electroplating, plasma spray, thermal spray, injection, chemical vapor deposition, physical vapor deposition and sputtering. These processes can be followed by heat treatment to densify the solid state ionic conductive electrolyte.

Figure 2:
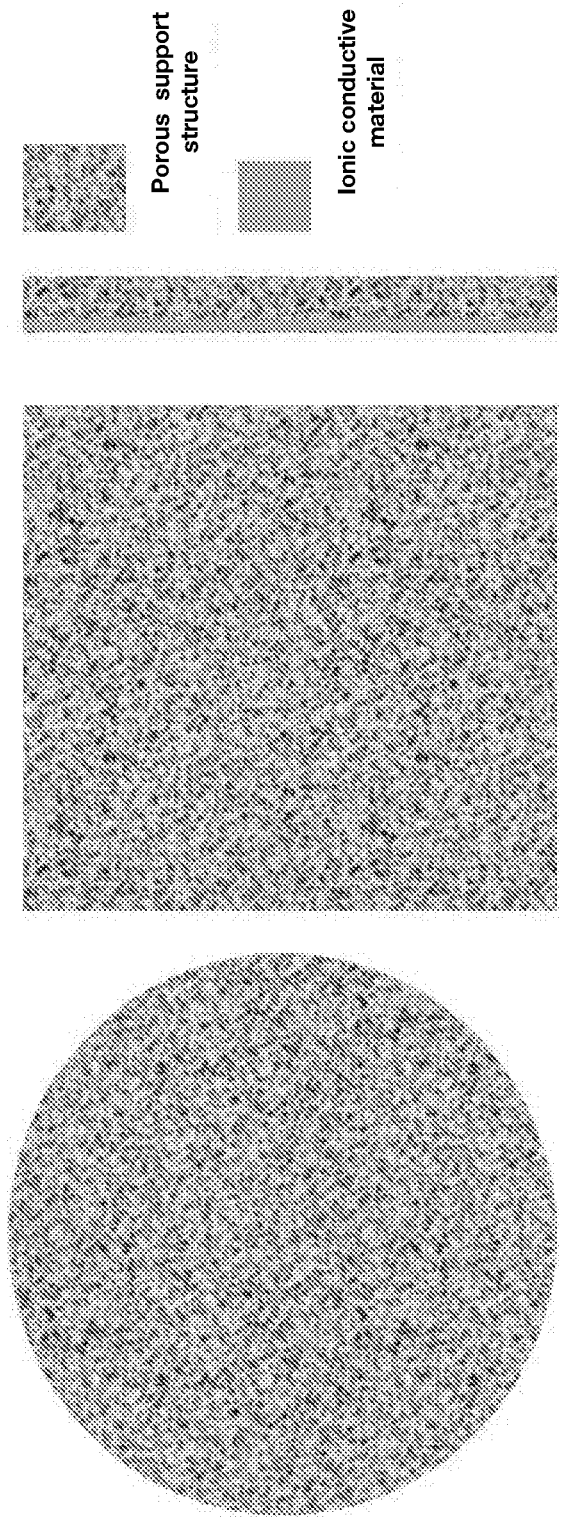
FIG. 2 illustrates a top view of an exemplary flat plate shaped solid state ionic conductive electrolyte membrane, a top view of an exemplary disk plate shaped solid state ionic conductive electrolyte membrane, and a side view of the solid state ionic conductive electrolyte membranes, in which the membranes include a porous support structure and a material used for the solid state ionic conductive electrolyte is disposed on the porous support structure.
Figure 3:
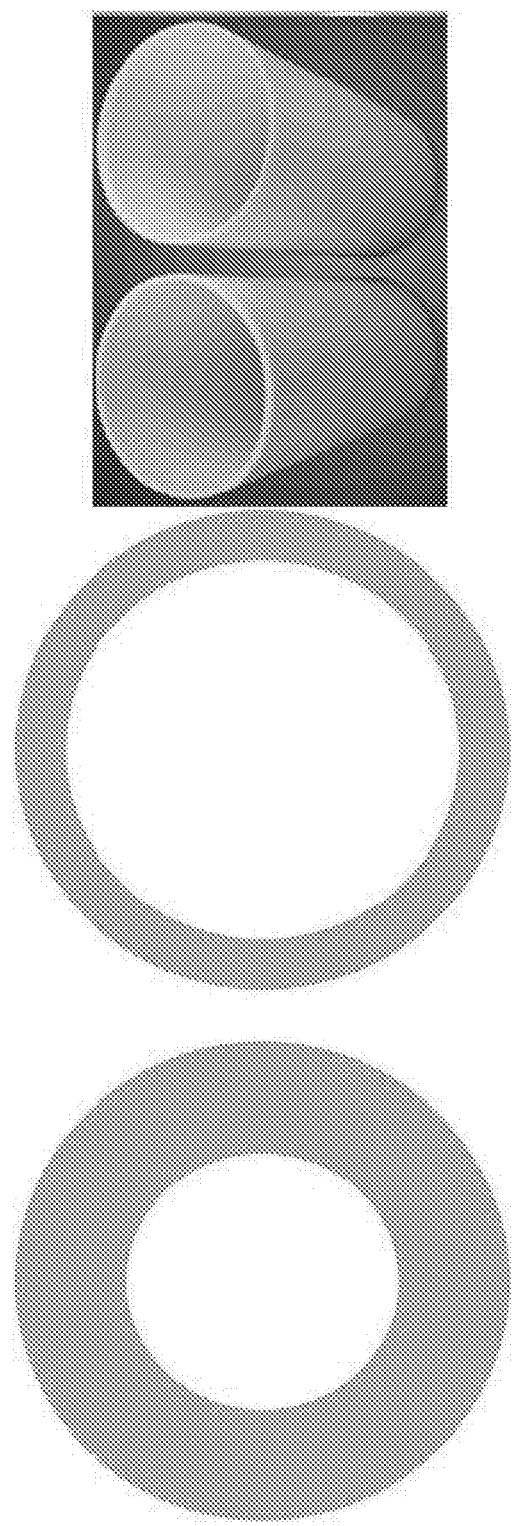
FIG. 3 illustrates a top view of an exemplary solid state ionic conductor material in the form of tube, a top view of the solid state ionic conductor material after machining into a thinner wall tube, and perspective views of the solid state ionic conductor materials.
Figure 4:
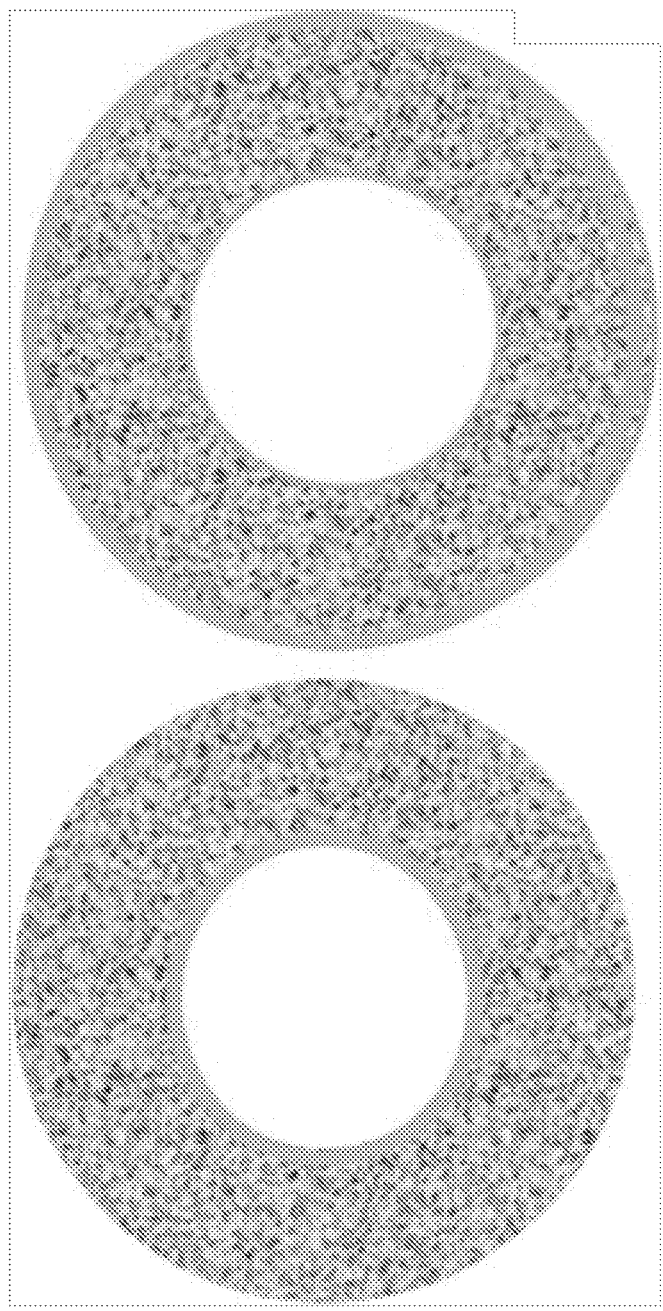
FIG. 4 illustrates an end view of an exemplary solid state ionic conductor membrane in the form of tube, in which the membrane include a tubular porous support structure and a material used for the solid state ionic conductive electrolyte is disposed on an inner wall of the porous support structure, an exemplary solid state ionic conductor membrane in the form of tube, in which the membrane include a tubular porous support structure and a material used for the solid state ionic conductive electrolyte is disposed on an outer wall of the porous support structure, and perspective views of an exemplary tubular porous support structure on which the solid state ionic conductive electrolyte is disposed.
Figure 4:
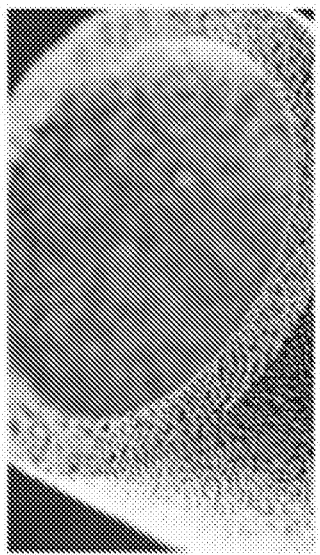

Exemplary structural designs for membrane include, but are not limited to the following forms:

1. First, the membrane may include solid pellet with solid state ionic conductor all through the materials, like shown in FIG. 1. The shape can be a flat plate or disk or any shape that can fit the mounting bracket. The feeding flux and sweeping fluxes are the two sides of the membrane. The whole piece is ionic conductive, the ionic conductive material itself plays the role of ionic conductor and itself also provides the mechanical support. As shown in FIG. 1, the whole membrane is comprised with solid state ionic conducting materials. To increase the lithium conductance, it is preferred to make the membrane very thin. The shape may be flat or may be tailored into different shapes to, for example, fit mounting fixtures.
2. Second, the membrane may include ionic conductive materials built on top of a porous supporting structure. The porous supporting structure provides the mechanical support while at the same time allowing liquid to pass through. The ionic conductive layer is built on top of the porous structure. In this case, the layer can be made very thin, thereby significantly improving the ionic conductance and decreasing the amount of ionic conductive material used, without compromising the overall mechanical strength of the membrane. As shown in FIG. 2, the ionic conducting material is built on the top of a porous supporting structure. The shape may be flat or may be tailored into different shapes to, for example, fit mounting fixtures.
3. Third, the membrane may include a solid state ionic conductor material in the form of tubes, wherein the feeding flux may flow inside the tube and the sweeping flux may flow from outside, or vice versa. For example, a solid state ionic conductor material may be made into thick walled tubes and then machined into thinner wall tubes, wherein the whole tube is built with solid state ionic conductor materials. Alternatively, the solid state ionic conductor material can be formed directly into thin walled tubes, thereby decreasing material consumption. As shown in FIG. 3, the ionic conducting material is made into tubes and machined into thinner wall tubes.
4. Fourth, the membrane may include a porous tube and the solid state ionic conductor material may be built either (i) on the inner wall, (ii) on the outer wall, or (iii) on both the inner and outer walls of the porous tube, in which the liquid can still flow through. In this case, the ionic conductive layer can be very thin, thereby significantly improving the ionic conductance and decreasing the amount of ionic conductive material used, without compromising the overall mechanical strength of the membrane structure. The feeding flux may flow inside the tube and the sweeping flux may flow from outside, or vice versa. As shown in FIG. 4, a thin ionic conductive material is built onto porous supporting tubes, which avoids machining and thin layer thickness allows high ionic conductance.
5. Fifth, the membrane may include a multi-channel porous structure as further described in the second embodiment below.

According to a second embodiment of the present description, there is a solid state ionic conductive electrolyte membrane comprising a multi-channel porous support structure and a solid state ionic conductive electrolyte in the multi-channel porous support structure. The solid state ionic conductive electrolyte membrane of the second embodiment may include one or more of the following additional aspects.

In an aspect, the multi-channel porous support structure may further include a plurality of channels formed therein, and wherein the solid state ionic conductive electrolyte is disposed in the plurality of channels of the multi-channel porous support structure.

In another aspect, the multi-channel porous support structure may further include a plurality of channels formed therein, wherein adjacent channels of the plurality of channels are separated by porous walls of the porous support structure. The solid state ionic conductive electrolyte may be disposed on the porous walls of the porous support structure.

In another aspect, the plurality of channels may include a plurality of first channels, a plurality of second channels adjacent to the plurality of first channels and separated from the plurality of first channels by the porous walls.

In yet another aspect, the solid state ionic conductive electrolyte may be disposed on the porous walls within one of the plurality of first channels and the plurality of second channels.

In yet another aspect, the plurality of first channels and the plurality of second channels may be alternatively plugged at opposing ends thereof.

Figure 5:
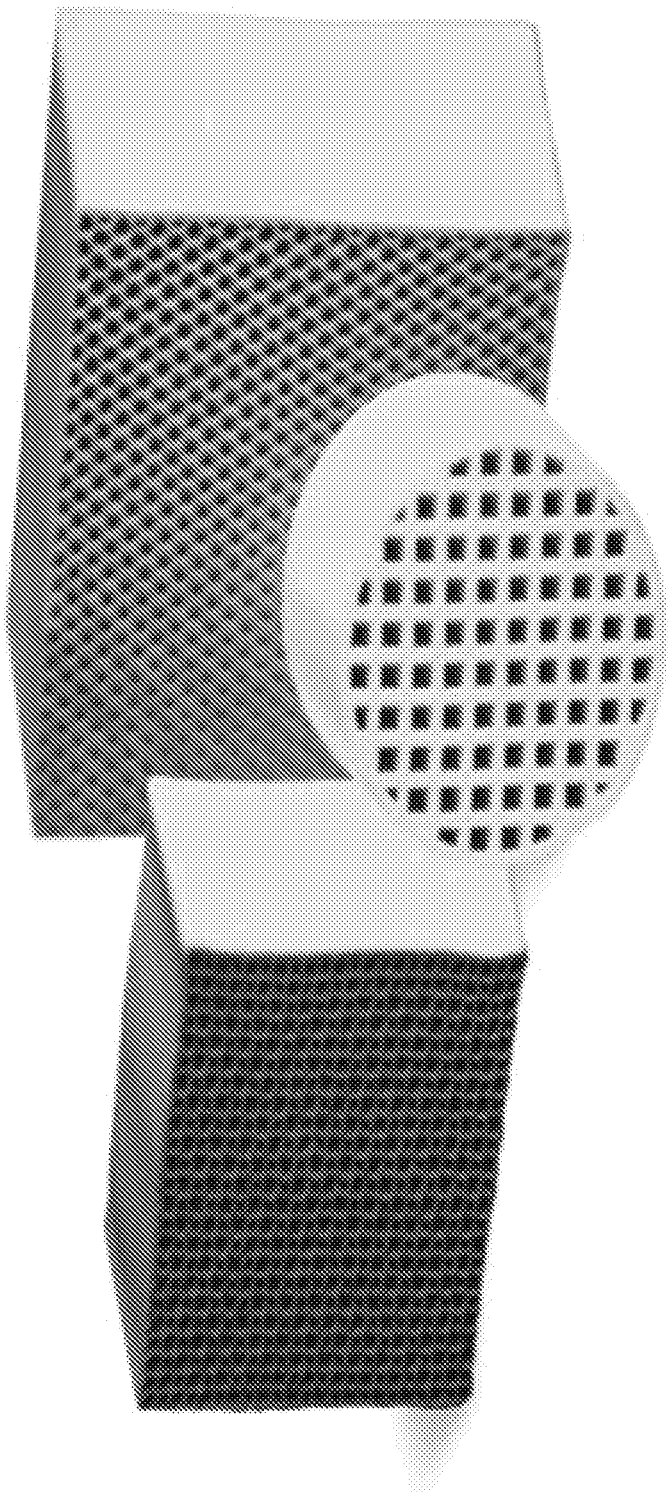
FIG. 5 is a perspective view of exemplary multi-channel porous support structures in which a solid state ionic conductive material may be built.
Figure 6:
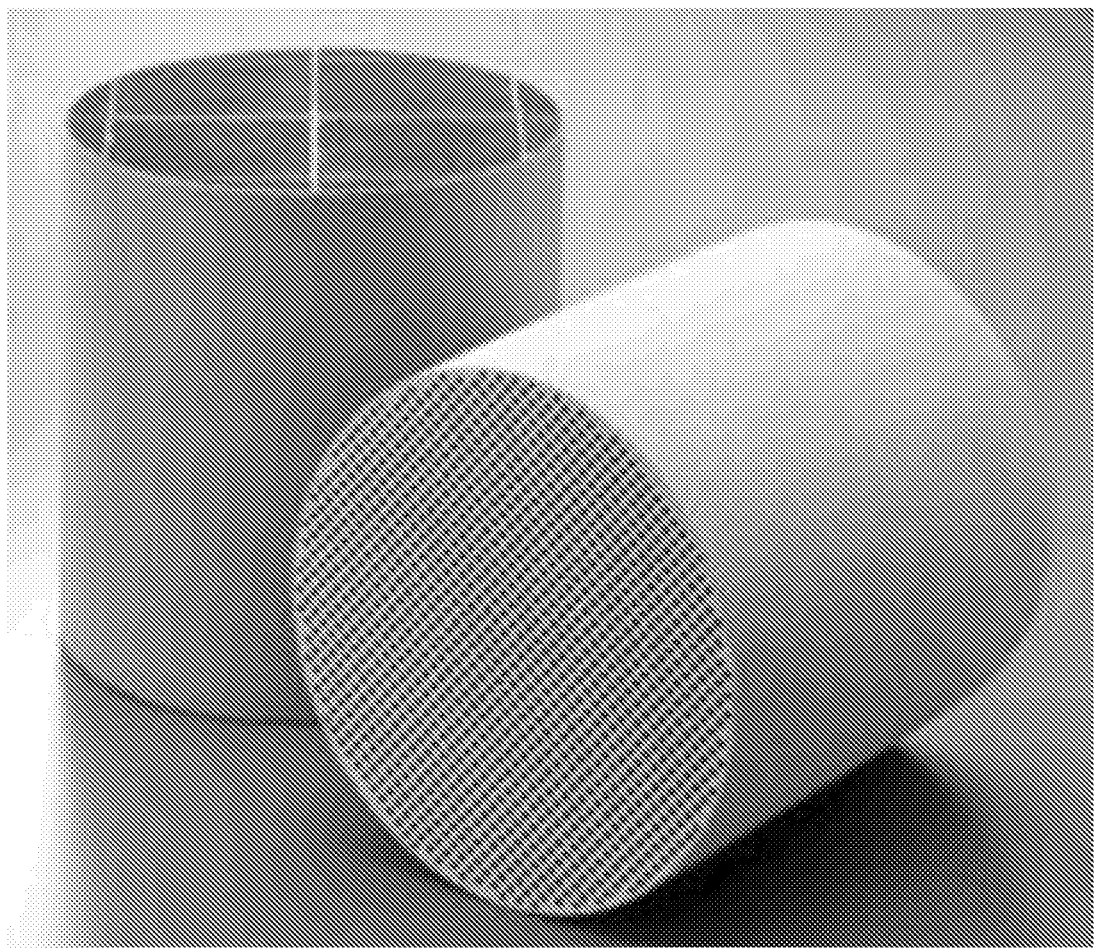
FIG. 6 is a perspective view of additional exemplary multi-channel porous support structures in which a solid state ionic conductive material may be built.

FIGS. 5 and 6 illustrate exemplary multi-channel porous support structures for the solid state ionic conductive electrolyte membranes of the second embodiment. In the illustrated example, the multi-channel porous support structures are multi-channel porous support tubes, but the present description is not limited to tubular shapes. Thus, FIGS. 5 and 6 show multichannel porous supporting tubes in which a thin ionic conductive material may be built onto.

Figure 7:
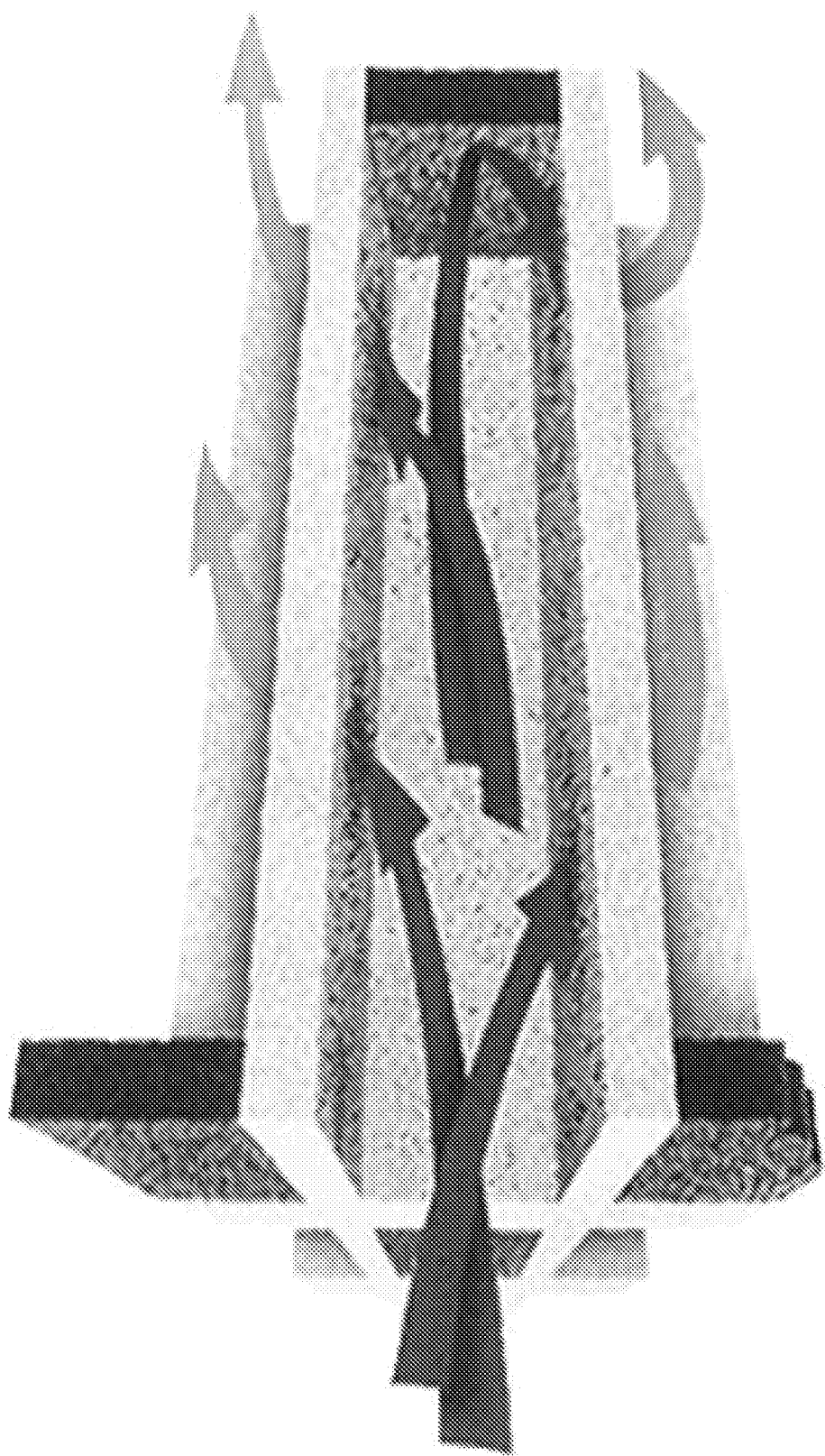
FIG. 7 is a representation showing an exemplary structure of a multichannel porous structure and an exemplary path of alkaline metal ions (e.g., lithium ions) through the structure, in which adjacent channels are alternatively plugged at each end in order to force a flux of alkaline metal ions through the porous walls having the solid state ionic conductor material built thereon.

To produce the solid state ionic conductive electrolyte membrane of the second embodiment of the present description, a solid state ionic conductor material may be built into the multi-channel porous structure. Furthermore, a flow-through monolith can be created by plugging selected channels. More particularly, adjacent channels may be alternatively plugged at each end in order to force the flux of through the porous substrate walls which act as a filter. To reflect this flow pattern, the substrates are referred to as the wall-flow monoliths. FIG. 7 shows an exemplary structure of a multichannel porous structure and an exemplary path of alkaline metal ions (e.g., lithium ions) through the structure.

The solid state ionic conductive layer may be built with traditional slurry sedimentation, spraying, painting, screen printing, evaporation, Sol-gel coating, dipping, filtration, pyrolysis, electroplating, electrospinning, plasma spray, thermal spray, injection, chemical vapor deposition, physical vapor deposition and sputtering. These processes can be followed by heat treatment to densify the ionic conductive layer and form the right structural phases for optimal ionic conductivity.

By producing the solid state ionic conductive electrolyte membrane as a multi-channel porous support structure and a solid state ionic conductive electrolyte in the multi-channel porous support structure, a surface area of the solid state ionic conductive electrolyte is increased in comparison with other structures previously described in the present application. By increasing surface area of the solid state ionic conductive electrolyte, an efficiency of the method for selectively extracting alkaline metals from metal-rich solutions can be increased.

The above-described solid state ionic conductive electrolyte membrane according to the second embodiment of the present description is not limited by the material used for the solid state ionic conductive electrolyte.

In an aspect, the material used for the solid state ionic conductive electrolyte of the second embodiment may have one or more of the following characteristics:

First, a material used for the solid state ionic conductive electrolyte has high lithium ionic conductivity either at room temperature or reasonable elevated temperature. In an example, the material used for the solid state ionic conductive electrolyte has a lithium ionic conductivity of higher than $0.5 \times 10^{-5}$ S/cm at room temperature. In another example, the material used for the solid state ionic conductive electrolyte has a lithium ionic conductivity of from $1 \times 10^{-4}$ to $5 \times 10^{-2}$ S/cm at room temperature. In yet another example, the material used for the solid state ionic conductive electrolyte has a lithium ionic conductivity of from $5 \times 10^{-4}$ to $5 \times 10^{-2}$ S/cm at an elevated temperature.

Second, a material used for the solid state ionic conductive electrolyte has a high selectivity to lithium, meaning selectively letting lithium pass through over other elements in the lithium-rich solution. Preferably, a material used for the solid state ionic conductive electrolyte only allows lithium to pass through and no other elements are allowed to pass.

Third, a material used for the solid state ionic conductive electrolyte is stable with respect to the lithium-rich solution on the first side of the membrane and with respect to the solution on the second side of the membrane. In an aspect, aqueous systems are preferred for the solutions on the first and second side of the membrane, therefore, when aqueous systems are selected, the material is stable in water. Stable here means the material can withhold its mechanical structure and functional properties within a reasonable life time of the application.

Fourth, a material used for the solid state ionic conductive electrolyte is stable in at least some acidic or basic conditions. But by no means is there a requirement for either side one or two to be acidic or basic.

Fifth, since the membranes are not used in a battery system, the material used for the solid state ionic conductive electrolyte does not necessarily have to be stable to lithium metal.

Materials used for the solid state ionic conductive electrolyte may include, but are not limited to, one or more of the following ceramics or ceramic glass composites:

(I) Perovskite-type oxides, such as $(Li,La)TiO_3$ or doped or replaced compounds;

(II) NASICON-structured lithium electrolytes, such as LAGP $(Li_{1+x}Al_xGe_{2-x}(PO_4)_3)$, LATP $(Li_{1+x}Al_xTi_{2-x}(PO_4)_3)$ and these materials with other elements doped; and (III) any one of the garnet-like structure oxide materials as described above in reference to the first embodiment of the present description.

According to an additional embodiment of the present description, there is a system for selectively extracting alkaline metals, in which the system includes a first solution (which may be called a feeding flux) comprising a first concentration of alkaline ions, a second solution (which may be called a sweep flux) comprising a second concentration of alkaline ions, the first concentration of alkaline ions being higher than the second concentration of alkaline ions, and a solid state ionic conductive electrolyte membrane separating the first solution from the second solution, in which the solid state ionic conductive electrolyte membrane is a solid state ionic conductive electrolyte membrane according to the first embodiment or is a solid state ionic conductive electrolyte membrane according the second embodiment. Accordingly, lithium-rich solutions may be provided to the first side of the membrane, lithium may selectively pass through the solid state ionic conductive electrolyte of the membrane, and the lithium that passed through the membrane may be extracted from the second side.

In a specific aspect, the first and second concentrations of alkaline ions are first and second concentrations of lithium ions.

In another specific aspect, at least one of the first solution of the system and the second solution of the system is an aqueous solution. More specifically, the system may include that the first solution of the system is an aqueous solution and the second solution is a non-aqueous solution. Alternatively, the system may include that the first solution of the system is a non-aqueous solution and the second solution is an aqueous solution. In another alternative, the system may include that the first solution of the system is an aqueous solution and the second solution is an aqueous solution.

Also, according to an additional embodiment of the present description, there is a method for selectively extracting alkaline metals. The method includes providing a first solution (which may be called a feeding flux) comprising a concentration of alkaline ions, selectively passing the alkaline ions through a solid state ionic conductive electrolyte membrane, in which the solid state ionic conductive electrolyte membrane is a solid state ionic conductive electrolyte membrane according to the first embodiment of the present description or is a solid state ionic conductive electrolyte membrane according the second embodiment of the present description, and extracting the alkaline ions passed through the solid state ionic conductive electrolyte membrane.

The highly concentrated lithium feeding flux may include, but is not limited to, natural brine, brine as a byproduct from industrial applications, digested/dissolved solution from lithium rich Spodumene or other natural lithium minerals, digested/dissolved solution or electrolyte from recycled lithium batteries, digested/dissolved lithium metal or lithium containing anode, digested/dissolved lithium containing cathodes, or recycled materials from lithium battery production processes.

Brine as a byproduct from industrial applications includes, but is not limited to, acid mine or acid rock drainage, food and beverage processing, desalination, wastewater treatment, wastewater from power plants, oil and natural gas extraction, pulp and paper mill effluent.

Lithium batteries include, but are not limited to, lithium-ion battery, lithium air battery, lithium-cobalt oxide battery, lithium-titanate battery, lithium-iron phosphate battery, lithium-nickel manganese cobalt oxide battery, lithium-manganese oxide battery, lithium-ion polymer battery, lithium sulfur battery, thin film lithium battery and lithium-ion flow battery or any other electrical energy storage device that is based on the storage of lithium ions.

The digestion/dissolving process may include, but is not limited to, a process involving pulverization and dissolution in compatible aqueous based solutions whether it be acidic, neutral, or basic, or any non-aqueous based solutions. To make the process inexpensive, aqueous based process is preferred.

The sweep flux may include aqueous solutions or non-aqueous solutions that can collect the lithium or react with lithium to form a lithium salt that can be easily collected or can form lithium related solutions that can be directly refined or used in targeted applications, such as, but not limited to, lithium batteries, production of lithium precursors for items listed above, production of lithium containing compounds, and lithium based solvents.

In an additional option, the systems and methods for selectively extracting metals from metal-rich solutions using solid state ionic electrolytes may include adding electric current collectors such as carbon or other electrically conductive materials. The electric current collectors may be applied on one or both sides of the solid state ionic conductive membrane to increase the throughput of the extraction of lithium through the membrane with an externally applied electric field.

The above described systems and methods for selectively extracting metals from metal-rich solutions using solid state ionic electrolytes are believed to be able to improve the efficiency and lower the cost of the extraction of lithium from either natural minerals or recycled lithium batteries.

The above described systems and methods for selectively extracting metals from metal-rich solutions using solid state ionic electrolytes are believed to be able to produce higher purity of lithium by filtering out other elements, thereby avoiding or reducing the cost to further refine the products.

The above described systems and methods for selectively extracting metals from metal-rich solutions using solid state ionic electrolytes are believed to be able to reduce the material consumption for making these membranes. At the same time, by reducing the thickness of the membranes, it further increases the conductance of the membrane, and increases the throughput of lithium extraction.

Although various embodiments of the disclosed systems and methods for selectively extracting alkaline metals from metal-rich solutions have been shown and described, modifications may occur to those skilled in the art upon reading the specification. The present application includes such modifications and is limited only by the scope of the claims.

What is claimed is:

1. A solid state ionic conductive electrolyte membrane comprising:
   a multi-channel porous support structure, the multi-channel porous support structure defining a porous wall structure separating a first plurality of channels from a second plurality of channels; and
   a solid-state ionic conductive electrolyte positioned within pores of the porous wall structure of the multi-channel structure.

2. The solid state ionic conductive electrolyte membrane of claim 1, wherein the solid state ionic conductive electrolyte comprises a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure,
   i. where A stands for one or more trivalent rare earth elements,
   ii. where A' stands for one or more alkaline earth elements,
   iii. where A" stands for one or more alkaline metal elements other than Li, and
   iv. wherein 0<a'<2 and 0<a"<1;
b. where B, B', and B" stand for an octahedral position of the crystal structure,
   i. where B stands for one or more tetravalent elements,
   ii. where B' stands for one or more pentavalent elements,
   iii. where B" stands for one or more hexavalent elements, and
   iv. wherein 0<b', 0<b", and b'+b"<2;
c. where C' and C" stand for a tetrahedral position of the crystal structure,
   i. where C' stands for one or more of Al, Ga, and boron,
   ii. where C" stands for one or more of Si and Ge, and
   iii. wherein 0<c'<0.5 and 0<c"<0.4; and
d. wherein n=7+a'+2·a"−b'−2·b"−3·c'−4·c" and 5.5<n<6.875.

3. The solid state ionic conductive electrolyte membrane of claim 1, wherein the solid state ionic conductive electrolyte comprises a perovskite-type oxide with the formula (Li, La)TiO$_3$.

4. The solid state ionic conductive electrolyte membrane of claim 1, wherein the solid state ionic conductive electrolyte comprises a NASICON-structured lithium electrolyte.

5. The solid state ionic conductive electrolyte membrane of claim 1, wherein the solid state ionic conductive electrolyte comprises a garnet-like structure oxide material.

6. The solid state ionic conductive electrolyte membrane of claim 1, wherein the multi-channel porous support structure is electrically conductive.

7. The solid state ionic conductive electrolyte membrane of claim 1, wherein the multi-channel porous support structure is electrically non-conductive.

8. The solid state ionic conductive electrolyte membrane of claim 1, wherein adjacent channels of the first and second plurality of channels are alternatively plugged at each end.

9. A system for selectively extracting selectively extracting alkaline metals, the system comprising:
   the solid state ionic conductive electrolyte membrane of claim 1;
   a first solution comprising a first concentration of alkaline ions in the first plurality of channels of the multi-channel porous support structure; and
   a second solution comprising a second concentration of alkaline ions in the second plurality of channels of the multi-channel porous support structure, the first concentration of alkaline ions being higher than the second concentration of alkaline ions.

10. The system of claim 9, wherein the alkaline ions comprise at least one of lithium ions, sodium ions, and potassium ions.

11. The system of claim 9, wherein at least one of the first solution and the second solution is an aqueous solution.

12. The system of claim 9, wherein at least one of the first solution and the second solution is a non-aqueous solution.

13. The system of claim 9, wherein the first solution is an aqueous solution and the second solution is a non-aqueous solution.

14. The system of claim 9, wherein the first solution is a non-aqueous solution and the second solution is an aqueous solution.

15. The system of claim 9, wherein the first solution comprises at least one of natural brine and brine as a byproduct from an industrial application.

16. The system of claim 9, wherein the first solution comprises a digested or dissolved solution of at least one of a natural lithium mineral, a recycled lithium battery, a lithium metal or lithium containing anode, a lithium containing cathode, and a recycled material from a lithium battery production process.

* * * * *